United States Patent Office 3,429,950
Patented Feb. 25, 1969

3,429,950
B-STAGE UNSATURATED POLYESTER RESINS AND PREPREGS USING 2-5 DIALKYL BENZOQUINONE
Phillip H. Parker, Jr., San Rafael, Calif., assignor to Chevron Research Company, San Francisco, Calif., a corporation of Delaware
No Drawing. Continuation-in-part of application Ser. No. 214,856, Aug. 6, 1962. This application Aug. 8, 1966, Ser. No. 570,746
U.S. Cl. 260—866    10 Claims
Int. Cl. C08f 21/00, 45/10

ABSTRACT OF THE DISCLOSURE

Stable B-stage polyester resins are produced by copolymerizing ethylenically unsaturated monomers with unsaturated polyesters in the presence of a critical amount of dialkyl p-benzoquinone in which the alkyl radicals are secondary or tertiary and contain a total of from 6 to 20 carbon atoms and from about 0.01 to 5.0 percent by weight of an organic peroxide free-radical polymerization initiator wherein the mol ratio of quinone to initiator ranges from 1:0.5 to 1:4.

---

This application is a continuation-in-part of my copending application Ser. No. 214,856, filed Aug. 6, 1962, which in turn is a continuation-in-part of my application Ser. No. 18,827, filed Mar. 31, 1960, now abandoned.

This invention relates to the copolymerizable, curable mixtures of ethylenically unsaturated monomers and ethylenically unsaturated resinous reaction products of a polycarboxylic acid and a polyhydric alcohol, the curing characteristics of which are modified by the inclusion of a polymerizatin modifier combination; to the partially polymerized articles or products which can be produced therefrom; and to methods for their preparation.

Copolymerizable mixtures of ethylenically unsaturated monomers or vinyl monomers and ethylenically unsaturated polyesters, i.e., resinous reaction products of a polycarboxylic acid and a polyhydric alcohol sometimes also called unsaturated alkyds are very useful for the production of surface coatings, molded articles, laminated bodies, and the like. The copolymerizable mixtures are generally fluid and undergo addition copolymerization wherein the polyester is cross-linked by the vinyl compound to form an infusible insoluble thermoset resin.

Problems have been encountered in the production of large volume articles from these copolymerizable mixtures because of the inability to control the cross-linking reaction once it has begun. The cross-linking reaction, once started, goes to completion. Accordingly, the usefulness of these mixtures has been limited by processing difficulties due to the fact that the mixtures have been processible only in the fluid state, i.e., requiring the fabricator employing these mixtures to use them in the fluid state.

In the case of phenol-formaldehyde resins, a similar problem was solved by partially polymerizing the mixture to an intermediate polymerization state in which the product was a fusible, somewhat soluble, fluid polymer which could be handled easily, fabricated into form, and then finally cured by heating to an infusible, insoluble, solid article. In this particular resin field, three molecular stages are recognized and often referred to in the art of thermoset phenolic resins: A-stage resin, consisting of comparatively short, linear, functional molecules, usually liquid, soluble in a number of solvents, and fusible; B-stage resin composed of longer chains, still functional, and usually solid; the B-stage resin being relatively insoluble but still fusible; and C-stage resin which is so cross-linked that it is infusible and insoluble.

The ability to obtain polyesters of the B-stage type, i.e., partially polymerized to a degree between the gel point and the fully cured state, is highly desirable. The practical advantage of such form of resin can conveniently be illustrated in the application of the resin not only to a molding operation or applied as a surface coating to an article, but also in the impregnation of a filler such as a fabric or fibrous base particularly in the formation of B-staged polyester prepregs which can be fully cured at some later date.

Thus, in the formation of prepregs as currently practiced, the copolymerizable mixture is impregnated in a fibrous sheet-form reinforcing material such as glass cloth or mat, cotton, linen, paper, and synthetic woven materials including nylon and orlon. The combined resin and glass cloth or mat can be obtained in catalyzed ready-to-use sheet rolls which can be made into pre-forms or laid up directly on a mold. Subsequently, copolymerization yields a rigid structure which may have any desired shape depending upon the shape in which the mat is held during copolymerization. When a plurality of mats impregnated with the copolymerized mixture is placed together during copolymeization, valuable laminated materials are produced having exceptional strength.

Current commercial producers of ethylenically unsaturated polyester prepregs are confronted by the problem that once vinyl polymerization is initiated, it proceeds to completion and an infusible resin is obtained. If polymerization has not been initiated, the more volatile monomers, e.g., styrene, are gradually volatilized and lost from the prepreg composition. Accordingly, presently available ethylenically unsaturated polyester prepregs are restricted to the use of expensive copolymerizing monomer compounds such as diallylphthalate which inherently has a low volatility.

It has now been found that the copolymerization of ethylenically unsaturated monomers and ethylenically unsaturated polyesters can be interrupted and that a B-stage unsaturated polyester composition can be produced by incorporating into the fluid copolymerizable mixture the combination of a free radical polymerization initiator and a specific class of quinone modifiers, provided the mol ratio of quinone modifier to initiator is held within critical proportions. Thus, it has been found that a B-staged form of a copolymerizable unsaturated polyester-ethylenically unsaturated monomer composition may be obtained by incorporating in the fluid mixture of the unsaturated polyester and ethylenically unsaturated monomer a combination of a free radical initiator and a dialkyl p-benzoquinone in which the alkyl radicals are either secondary or tertiary alkyl radicals and contain a total of from 6 to 20 carbon atoms with the further provision that the mol ratio of quinone to initiator should lie within the range of 1:0.5 to 1:4 and preferably 1:0.5 to 1:2. Particularly preferred are the dialkyl p-benzoquinones in which the alkyl radicals are teritary alkyl radicals such as 2,5-di-tertiarybutyl p-benzoquinone.

Accordingly, suitable polymerization modifiers can be represented by the formula:

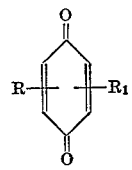

wherein R and R₁ represent secondary or tertiary alkyl radical groups such as propyl, butyl, amyl, hexyl, octyl, nonyl, decyl, the total number of carbon atoms in both R and $R_1$ being in the range of 6 to as high as 20. R and $R_1$ are normally in the 2 and 5 positions on the ring.

As indicated, the conventional free radical polymerization initiators may be used. However, for practical application and utilization of the B-staged form it is desirable to use a relatively low-temperature initiator for the initial formation of the B-staged resin, i.e., a free radical catalyst which has a relatively short half-life at ambient temperatures.

As illustrations of suitable free-radical initiators, there can be mentioned peroxidic compounds, such as methylethylketone peroxide, benzoyl peroxide, cumene hydroperoxide, t-butyl peroxide, azo compounds, such as azo-bis-isobutyronitrile; light-activated initiators, such as benzoin. The free-radical initiator is employed in an amount of from 0.005 to 5.0, and preferably from 0.01 to 2.0, weight percent, based on the sum of the weights of the monomer and polyester, so long as the aforesaid ratio of substituted quinone and free-radical initiator is maintained.

The manner of incorporating the modifying combination of free-radical initiator and substituted quinone is not critical. Conveniently, the addition of these agents is made during the mixing step of monomer and polyester or after the two are mixed. The temperature employed to effect polymerization to the B-stage will depend on the initiator used, the size of the article and the time available for reaction. As is well known in the art, the half-life of the free radical initiator, which can be determined from the literature, decreases with increasing temperature, resulting in a more rapid polymerization. For example, in the use of benzoyl peroxide, B-staging polymerization temperatures above 60° C. will be satisfactory. Lower temperatures are possible with this initiator when activated by dimethyl aniline. With methylethylketone peroxide and cobalt naphthenate activator, a temperature of about 25° to 60° C. will be satisfactory.

The use of accelerators with free radical initiators for the purpose of permitting a lower temperature initiation is well known in the unsaturated polyester art. The presence or absence of these materials does not effect the B-stageability of the system but only the time required to reach this stage.

As indicated, the new modifier combination of the invention permits rapid partial polymerization of the mixture to a solid, but will substantially inhibit or stop copolymerization of the mixture thereafter, thereby producing a B-staged, plastic fusible solid copolymerizable mixture containing copolymer of the vinyl monomer and polyester along with some unreacted monomer and polyester. The production of these solid copolymerizable mixtures has been very difficult heretofore because the production of some copolymer in the mixture has resulted in complete copolymerization of the mixture. The partially cured, fusible, rubbery, putty-like, solid further copolymerizable mixtures which can be produced by this invention are very useful because they greatly increase the efficiency with which desired resins can be produced and/or used. For example, the B-staged material may be used as an easily handled feed for molding operations.

The B-stage resin can be used alone or in combination with fillers. For instance, fibrous sheet-form reinforcing filler material, e.g., glass cloth or mat, in amounts of 5 to 80%, preferably around 40%, by weight, of combined glass and resin, may be impregnated in conventional manner, e.g., by dipping or solvent deposition, spreading or the like, with the fluid copolymerizable mixture including the modifier-initiator combination of this invention, and partially polymerized to produce a dry, flexible reinforced plastic which may be formed into essentially tack-free rolls and stored for long periods of time, i.e., three months or more. When desired, such sheets of material can be formed to the desired shape and size and then fully cured to rigid, infusible articles.

Similarly, useful products can be obtained by the incorporation of the B-stage polyester with non-fibrous particulate filler material, for example, clay or sand; or with asbestos, cork, calcium carbonate, and the like, to prepare premix or gunk molding compositions, useful, for example, in the manufacture of composition tiles. In combining the B-stage resin with the filler material, the components of the B-stage resin may be incorporated with the filler prior to partial polymerization, and then partially polymerized to the B-stage, or the performed plastic B-stage resin may be simply incorporated with the filler material, by physically mixing the two.

At a later time, the B-stage treated dry product containing filler may be layered, molded and shaped, and polymerization initiated a second time to produce the finally desired insoluble, infusible rigid filled article, such as laminated cloth, glass fiber, tile, and the like. The second copolymerization can be initiated by any convenient free radical mechanism such as high temperature alone or by decomposition of a peroxide initiator. This peroxide may be included in the original fluid copolymerizable mixture, or it may be added mechanically to the solid B-stage resin.

The modifier composition of this invention is effective in producing the B-staged copolymerizable solids from a wide variety of mixtures of ethylenically unsaturated monomers and ethylenically unsaturated polyesters conventionally employed in the art of unsaturated polyester manufacture useful in the reinforced plastics art, molding, and surface coating. The monomer present in the mixture is an ethylenically unsaturated compound capable of vinyl or addition polymerization. Specific examples of these monomers are styrene, α-methyl styrene, p-methyl styrene, chloro styrene, divinyl benzene, indene, cyclopentadiene, butadiene, vinyl acetate, methyl methacrylate, methyl acrylate, allyl acetate, diallyl phthalate, diallyl succinate, diallyl adipate, diallyl sebacate, diethylene glycol bis-(allyl carbonate), triallyl phosphate, vinyl chloride, acrylonitrile, triallyl cyanurate.

The extent or degree of polymerization in useful B-staged polyesters ranges from about 15 to 60%. Compositions of less than 15% polymerization are still tacky and have very little adherence. Those copolymers of over 60% polymerization are too stiff and insoluble to be workable. For different applications, the degree of B-staged polymerization can be varied between these limits. Thus for molding operations involving considerable bending and form fitting, or in milling operations wherein the B-staged polymer is mixed with insoluble fillers, a B-staged polyester of low degree of polymerization is preferred, i.e., one of 20–40% polymerization. For applications in which the material is to be used in a relatively flat form, as in a plywood overlay, a higher degree of B-stage polymerization is operable, i.e., from 40–60% polymerization. These variations in degree of polymerization of the B-staged polyester are obtained by changing the relative ratio of inhibitor to initiator within the range described herein. The extent of polymerization is increased by decreasing the ratio of inhibitor to initiator.

The unsaturated polyester employed in the mixture with the polymerizable vinyl monomer is a polyester containing ethylenically unsaturated units capable of copolymerization with the monomer to yield, finally, a thermoset hardened, infusible, insoluble resin. Desirably, but not necessarily, to solubilizing vinyl monomer is employed in the mixture in an amount of 5 to 75, preferably 30 to 50, percent by weight of the monomer-polyester mixture.

The unsaturated polyester is prepared in conventional fashion. Accordingly, the reaction can be carried out at temperatures of about 150 to 250° C. in an atmosphere of inert gas, such as nitrogen, or carbon dioxide, water formed during reaction being removed by distillation. If desired, the esterification reaction may be catalyzed by acids or acid salts, soluble in the reaction mixture, for example, p-toluene sulfonic acid. Premature cross-linking of the double bonds during esterification and consequently gelation, may be obviated by the use of inhibitors, such as hydroquinone, resorcinol, pyrogallol, tertiarybutyl catechol, phenylene diamines, aniline, benzaldehyde or ascorbic acid. While in general equimolecular proportions of glycol and dibasic acid can be employed, a slight stoichiometric excess of glycol from 3 to 5 mol percent over combined acid material is preferably employed to compensate for loss of glycol material during reaction. The extent of reaction can be followed by acid number determinations (acid number being defined as the number of milligrams of potassium hydroxide equivalent to the free acid in one gram of resin) and by viscosity determinations in an appropriate solvent, in accordance with common practice acid number determinations alone being satisfactory where the manufacturing process has been standardized. In general, polyesterification is conducted to a resin of acid number below 50, and preferably below 30. The unsaturated polyesters may be derived from the condensation of (a) one mol of an aliphatic glycol, such as those listed in Group I, with about one mol of an unsaturated aliphatic dicarboxylic acid, such as those listed in Group II; (b) one mol of an ethylenically unsaturated aliphatic glycol, such as those listed in Group III, with about one mol of a saturated dicarboxylic acid, such as those listed in Group IV; (c) about one mol of an aliphatic glycol, such as those listed in Group I, with from 0.1 to 1 mol of an ethylenically unsaturated dicarboxylic acid, such as those listed in Group II, and from 0.9 to 0 mol of a saturated dicarboxylic acid, such as those listed in Group IV; or (d) about one mol of mixed saturated and unsaturated glycols, such as those listed in Groups III and I, respectively, with one mol of saturated dicarboxylic acids, such as those listed in Group IV, or one mol of mixed saturated and unsaturated dicarboxylic acids, such as those listed in Groups IV and II, respectively. In addition, small amounts of the glycols and/or dicarboxylic acids can be replaced, respectively, by small amounts of other polyhydric alcohols, such as glycerin, or other polycarboxylic acids, such as pyromellitic acid; and any of the polycarboxylic acids can be employed as the corresponding anhydrides.

GROUP I.—SATURATED GLYCOLS

| | |
|---|---|
| Ethylene glycol. | Polyethylene glycol. |
| Diethylene glycol. | Tetramethylene glycol. |
| Triethylene glycol. | Pentamethylene glycol. |
| 1,3-trimethylene glycol. | Hexamethylene glycol. |
| 1,2-propylene glycol. | Octamethylene glycol. |
| Dipropylene glycol. | Tetraethylene glycol. |
| Butylene glycol. | Xylylene diol. |
| Styrene glycol. | 1,1'-isopropylidene bis-(p-phenoxy) di-2 propanol. |
| Halogen substituted glycols of the above. | |

GROUP II.—UNSATURATED DIACIDS

| | |
|---|---|
| Maleic acid. | Ethyl maleic acid. |
| Fumaric acid. | Chloromaleic acid. |
| Itaconic acid. | Bromomaleic acid. |
| Mesaconic acid. | Chlorofumaric acid. |
| Citraconic acid. | Bromofumaric acid. |

GROUP III.—UNSATURATED GLYCOLS

| | |
|---|---|
| Butene diol. | 1,6-hexene-2 diol. |
| Butyne diol. | 1,5-pentene-2 diol. |
| 1,6-hexene-3 diol. | |

GROUP IV.—SATURATED POLYACIDS

| | |
|---|---|
| Phthalic acid. | Oxalic acid. |
| Isophthalic acid. | Malonic acid. |
| Terephthalic acid. | Glutaric acid. |
| Tetrachlorophthalic acid. | Pimelic acid. |
| Succinic acid. | Biphenyldicarboxylic acid. |
| Adipic acid. | Naphthalene dicarboxylic acid. |
| Suberic acid. | Cyclohexane dicarboxylic acid. |
| Azelic acid. | Pyrotartaric acid. |
| Dimethyl succinic acid. | Sebacic acid. |
| Hexachloroendomethylene tetrahydro phthalic acid. | |

In a preferred embodiment of the invention the copolymerization of the fluid copolymerizable mixture to the B-stage is initiated at a relatively low temperature, for example, in the range of 25° C. to 65° C. Accordingly, it is desirable to initiate the copolymerization of the fluid mixture with so-called low temperature peroxidic free radical initiators which are activated at temperatures below 65° C. such as methylethylketone peroxide, methyl isobutyl ketone peroxide, cyclohexanone peroxide, and benzoyl peroxide. These ambient temperature initiators are generally employed in the presence of an accelerator or promotor known to the art. These include metallic salt driers, such as cobalt or manganese naphthenate or octoate; oxides and hydroxides of metals in Group 2A, such as barium, strontium, magnesium and calcium; quaternary ammonium compounds; mercaptans such as dodecyl mercaptan; multivalent metals in the lower oxidation state, such as $SnCl_2$; alkali metal sulfonates; and tertiary amines, such as dimethyl aniline or triethanol amine. As is known in the art, some accelerators function with a limited number of peroxidic substances, and not at all with others. These accelerators are generally used in from 0.001 to 1.0 weight percent, based on polyester and monomer.

As mentioned heretofore, copolymerization of the B-staged copolymerizable solids to the final cured, infusible state can be initiated in a number of ways. The initiation can be accomplished thermally, with or without a catalyst or initiator in the copolymerizable solid. If desired, additional polymerization initiators can be added and the polymerization carried to completion, the temperature being again dependent on half-life of the initiator used.

However, in the preferred embodiment wherein a low-temperature catalyst is employed in the B-stage operation, final reaction is brought to completion by incorporating in the solids a high-temperature addition polymerization initiator which will be activated thermally at temperatures above the peak exotherm of the first stage copolymerization of the fluid mixture. Accordingly, this high temperature catalyst can be incorporated in the original fluid mixture and is unaffected by the heat of partial polymerization of that mixture. The copolymerization of the B-staged copolymerizable solids can then be accomplished merely by heating the B-staged material to the temperature at which the high temperature catalyst is activated. Suitable high temperature catalysts for this purpose are the peroxide catalysts which are thermally stable at temperatures up to about 65° C. and are activated thermally at temperatures above about 65° C. Suitable high temperature catalysts of this type, in amounts of 0.1 to 5, preferably around 2%, based on polyester and vinyl monomer, are t-butyl hydroperoxide, ditertiarybutyl peroxide, cumene hydroperoxide, and dicumyl peroxide.

The invention, having been described in detail, is further illustrated by the following exemplification wherein representative dialkyl p-benzoquinones are used to modify the free radical polymerization of ethylenically unsaturated compounds to produce B-staged further copolymerizable solids from fluid copolymerizable mixtures of ethylenically unsaturated monomers and ethylenically unsaturated polyesters. Other examples illustrate the production of useful products from these B-staged polyesters.

Example 1.—Preparation of unsaturated polyester

An unsaturated polyester derived from propylene glycol, maleic anhydride and isophthalic acid, and having an isophthalic acid to maleic anhydride mol ratio of 3:1, was prepared as follows:

Isophthalic acid, 759 grams (4.56 mols) and propylene glycol, 485 grams (6.38 mols) were charged to a 2-liter flask and heated to between 180° C. and 250° C. under a nitrogen atmosphere for about 16 hours. After this heating period, the acid number of the mixture was 1.2. Propylene glycol distilled overhead during this heating was collected and, after the heating period, was added back to the mixture together with 149 grams (1.52 mols) of maleic anhydride; the mixture was then heated to between 160° C. and 215° C. for an additional 13 hours at which time the acid number of the mixture was 17. This polyester had a softening point of 95° C. and was just sufficiently fluid to pump at 160° C. It was cooled to 25° C., shattered, and ground to a fine powder. One hundred and five parts by weight of the powder was poured into 70 parts by weight of styrene at 25° C. over a period of two hours while the mixture was agitated. Thereafter, the mixture was agitated for an additional hour. The mixture thus produced was a clear fluid solution at 25° C.

Example 2.—Preparation of modified polyester-vinyl monomer solution

A copolymerizable mixture of styrene and a polyester derived from propylene glycol, isophthalic acid and maleic anhydride, and having an isophthalic acid to maleic anhydride mol ratio of 1:2, was prepared as follows. Propylene glycol, 71.8 kg. (0.921 mol) and isophthalic acid, 49.5 kg. (0.298 mol) were charged to a reaction vessel equipped with temperature controls and agitator, nitrogen inlet, and reflux condenser. The mixture was heated to a temperature of 204° C. for 7 hours until the acid number of the mixture was less than 5. Maleic anhydride, 58.6 kg. (0.598 mol) and 2.05 kg. of propylene glycol were then charged to the vessel, and the mixture was heated to a temperature of 199° C. over a period of 20 hours until the acid number of the mixture was less than 25. A 95.4 kg. portion of the polyester thus produced was cooled to room temperature, shattered, and ground to a fine powder and mixed with 63.6 kg. of styrene and 79.5 g. of 2,5-ditertiarybutyl p-benzoquinone, and the mixture was stirred at room temperature for a period of 3 hours, until a homogeneous fluid was obtained.

Example 3.—Preparation of a B-staged prepreg

A copolymerizable mixture of styrene and a propylene glycol, isophthalic acid, and maleic anhydride unsaturated polyester having a mol ratio of isophthalic acid to maleic anhydride of 1:1, was prepared by a procedure similar to that employed in Example 2. Seventy parts by weight of this copolymerizable mixture was dissolved in 30 parts by weight of acetone, and 0.5 part of 2,5-ditertiarybutyl p-benzoquinone was added thereto. To this mixture was added 1 part of methylethylketone peroxide (Lupersol DDM catalyst 60% active), 0.6 part of cobalt naphthenate (6% cobalt), these materials acting as a low temperature catalyst for initiation of the first stage polymerization at about 25° C. To this mixture was added 1.0 part of dicumyl peroxide, acting as a high temperature polymerization catalyst for the second stage of the polymerization. The mixture was then placed in a shallow pan, and a fiberglass cloth was dipped in the solution, immediately run between steel rollers to roll excess copolymerizable solution off of the cloth, and the cloth was hung in the open air. The copolymerizable mixture in the impregnated cloth set up very rapidly to a dry solid, leaving the impregnated cloth tack-free and very flexible.

Example 4.—Preparation of a laminated article

After about three months, the mat of Example 3 was cut into strips, and a stack of 12 strips was placed in a press and heated to 138° C. to initiate the second stage of the polymerization. In this way a strong 12-ply laminated article was made with the adjacent plies bonded together by copolymerization of the copolymerizable mixtures impregnated therein.

Examples 5-12.—Comparison of various quinones in polyester polymerization

The following examples illustrate the effect of different disubstituted quinones in the modifier combination.

To a polyester-styrene solution prepared as in Example 1, having an isophthalic acid to maleic anhydride ratio of 1:1, was added 1% dicumyl peroxide, 0.6% cobalt naphthenate, 0.6% methylethylketone peroxide, and 22.8 mols of disubstituted quinone per million parts of polyester plus styrene (mol ratio of disubstituted quinone: low temperature initiator=1:1.5). The time to partially polymerize to a solid at about 25° C. and the percent polymerization after intervals of time are given in Table I.

The solidification or gelling of the resin is easily observed as follows. A sample of the catalyzed mixture is placed in a test tube in a 25.5° C. bath, whereupon 5-millimeter glass beads are dropped into the sample. The gel time is taken as the earliest time after catalysis of the mixture at which the bead will not sink to the bottom of the test tube.

The percent polymerization of the gelled sample is determined by comparing the heat rise during further polymerization of a 50 g. sample in a 150 ml. beaker in a 114° C. bath with the heat rise from the complete polymerization of a sample in which no polymerization has occurred previously, and which contains no modifier.

TABLE I.—EFFECT OF DIFFERENT QUINONES

| Ex. No. | Quinone added | Time to polymerize to solid (gel time) | Percent polymerized 1 hr. after Solidification | Percent polymerized after— | | |
|---|---|---|---|---|---|---|
| | | | | 1 wk. | 1 mo. | 2 mos. |
| 5 | None | 17 min | 100 | 100 | 100 | 100 |
| 6 | p-Benzoquinone | >4 mos | | 0 | 0 | 0 |
| 7 | p-Toluquinone | >3.5 mos | | 0 | 0 | 0 |
| 8 | 2,5-dichloro-p-quinone | 3,600 min | 30 | 100 | | |
| 9 | 2,5-diisopropyl-p-quinone | 570 min | 20 | 20 | 25 | |
| 10 | 2,5-di-t-butyl-p-quinone | 30 min | 30 | 30 | 30 | 40 |
| 11 | 2,5-di-t-amyl-p-quinone | 33 min | 35 | 35 | 35 | 35 |
| 12 | 2,5-di-t-octyl-p-quinone | 22 min | 40 | 40 | 40 | 50 |

A consideration of the Table I indicates that no B-stage resin was obtained without the modifying combination (Example 5) but rather a completely cured polymer was obtained within 1 hour. Mono- and unsubstituted quinones are not satisfactory because they prevent gelation completely, as shown in Examples 6 and 7. A non-alkyl disubstituted quinone is also unsatisfactory (Example 8), because a long gelation period is required, and the product is not a stable B-stage material, as shown by a 100% polymerization after one week. Table I further shows that the tertiary disubstituted quinones are the best for B-staging rapidly (Examples 10, 11 and 12, as compared with Example 9).

Examples 13-19.—Determination of critical quinone: Initiator ratio

The following examples illustrate the effect of varying the molar ratio of disubstituted quinone (2,5-ditertiarybutyl p-benzoquinone) to low temperature initiator. Substantially the same procedure was followed in making up the samples and in the evaluation as that used in the above tabulated examples, except that the amount of disubstituted quinone was varied to give the ratios indicated.

TABLE II.—EFFECT OF VARYING MOLAR RATIO OF DISUBSTITUTED QUINONE

| Ex. No. | Molar ratio quinone to initiator | Time to polymerize to solid or gel | Percent polymerized 1 hr. after solidification | Percent polymerized after— | | |
|---|---|---|---|---|---|---|
| | | | | 1 wk. | 1 mo. | 2 mos. |
| 13 | 1:0.25 | >1 mo | | 0 | 0 | |
| 14 | 1:0.33 | >1 mo | | 0 | 0 | |
| 15 | 1:0.50 | 540 min | 20 | 20 | 30 | |
| 10 | 1:1.5 | 30 min | 20 | 30 | 30 | 40 |
| 16 | 1:2 | 20 min | 50 | 50 | 50 | |
| 17 | 1:3 | 15 min | 50 | 50 | 60 | |
| 18 | 1:4 | 10 min | 60 | 60 | 60 | |
| 19 | 1:15 | 8 min | 100 | | | |

It is apparent from an inspection of Table II that a mol ratio of disubstituted quinone to initiator varying from 1:4 to 1:0.5 is indeed critical (Examples 15 to 18). High mol ratios fail even to polymerize (Examples 13 and 14). Low mol ratios give too high a degree of polymerization. Polymerization beyond about 60% yields materials which are not moldable (Example 19).

Example 20.—Preparation of a B-staged polyester using cyclohexanone peroxide

Substantially the same procedure was used as in Example 10 except that cyclohexanone peroxide was used in place of methylethylketone peroxide. Comparable results were obtained and the product remained B-staged in excess of two months.

Example 21.—Preparation of a B-staged polyester

An unsaturated polyester was prepared from isophthalic acid, fumaric acid, diethyleneglycol and polyethylene glycol having an average molecular weight of 200, in which the molar ratio of reactants was 3:1:2.7:1.3, respectively. This polyester had an acid number of 13, and a viscosity of M on the Gardner-Holdt scale as measured on a 60% polyester in toluene solution.

Styrene, 40 parts, and the above-described polyester, 60 parts, were mixed together until a single homogeneous liquid phase was obtained, and then 0.5 part of 2,5-ditertiary butylquinone, 0.6 part of cobalt naphthenate (6% cobalt), 1 part of dicumyl peroxide, and 1 part of methylethylketone peroxide (60% in dimethyl phthalate) were added in that order, and each was completely mixed before the next was added. The molar ratio of quinone to methylethylketone peroxide was 1:2.7 in this solution. The above-described solution was poured into a shallow tray to a depth of ⅜ inch. The tray was placed in an oven at 48° C. for ¾ of an hour, during which time gelation occurred. The product, after cooling to room temperature, was a solid, flexible sheet of B-staged polyester. This material was placed in an ambient temperature storage area, and portions were removed as needed in Example 22.

Example 22.—Preparation of a filled article

The sheet prepared as in Example 22, 27 parts, was milled in a small 2-roll mill at ambient temperature, with 25 parts of asbestos, 43 parts of whiting and 5 parts of $TiO_2$. In this way a well dispersed mixture was obtained which was then pressed into a sheet and cured by heating at 135° C. for ¾ of an hour in an oven. The product was a smooth white, opaque panel, useful as a floor covering. The same results were obtained from the polyester sheet which had been in storage for a month.

Example 23.—Preparation of a B-staged polyester using benzoyl peroxide

An unsaturated polyester was prepared from isophthalic acid, maleic anhydride, and propylene glycol in molar ratios of 1:1:2, respectively. The polyester had an acid number of 16.5 and a viscosity of X+ on the Gardner-Holdt scale, as measured on a 60% ester in toluene solution. This polyester, 60 parts, was dissolved in 40 parts of styrene at 70° C. to give a viscous fluid solution. After cooling to room temperature, 0.5 part of ditertiarybutyl quinone, 1 part of benzoyl peroxide, and 1 part of dicumyl peroxide were individually added and mixed until a homogenous solution resulted. The molar ratio of 2,5-ditertiarybutyl quinone to benzoyl peroxide in this mixture was 1:2. Then 0.3 part of dimethyl aniline was added and after thorough mixing, the solution was allowed to stand at room temperature. Gelling occurred in about 10 minutes. Analysis of the B-staged polyester prepared in this way showed it to consist of 50% styrene-polyester reaction product, 29.7% unreacted styrene and 20.3% unreacted polyester. Some of the B-staged material was placed in a two-inch diameter disc mold and heated at 160° C. for three minutes under 1000 p.s.i.g. to give a rigid solid, unfilled coaster.

Example 24.—Comparison of methylethylketone peroxide with benzoyl peroxide (a) To the polyester-styrene solution of Example 23, 100 parts, there was added 0.75 part of 2,5-ditertiarybutyl quinone, 1 part dicumyl peroxide, 0.6 part of cobalt naphthenate, and finally 1 part of methylethylketone peroxide (60% active). The molar ratio of quinone to methylethylketone peroxide was 1:2. This solution was gelled at ambient temperature, as in Example 23, to give essentially the same B-staged product which was moldable after storage at ambient temperatures.

These experiments (23 and 24a) show that at the same ratio of quinone to initiator, methylethylketone peroxide plus cobalt naphthenate give the same B-staged product as does benzoyl peroxide plus dimethylaniline.

(b) Another experiment was carried out as in Example 24a, except that only 0.50 part of 2,5-ditertiarybutyl quinone was used as a polymerization moderator (a quinone to methylethylketone peroxide mole ratio of 1:3). The results were essentially the same as in Examples 23 and 24a.

(c) Another experiment was carried out as in Example 24a, except that only 0.25 part of 2,5-ditertiarybutyl quinone was used as a polymerization moderator, (a quinone to methylethylketone peroxide mole ratio of 1:6). In this case the polymerization did not stop at a fusible, plastic B-stage, but gave a solid, infusible, unmoldable cross-linked polymer.

These three experiments (24a, b, c) show that satisfactory B-staged polyesters can be obtained at quinone to initiator mole ratios of 1:2 and 1:3 but not at a 1:6 ratio.

Example 25.—Preparation of a B-staged polyester prepreg

An unsaturated polyester was prepared in the usual way from isophthalic acid, fumaric acid, diethylene glycol and ethylene glycol at a molar ratio of 3:4:5.6:1.4, respectively. Of this polyester, 65 parts were mixed with 35 parts of styrene until a homogenous fluid solution was obtained. To this solution there was added 1 part of dicumyl peroxide, 43 parts of aluminum silicate powder, 0.25 part of 2,5-ditertiarybutyl quinone and 1 part of benzoyl peroxide. This mixture contained 2,5-ditertiarybutyl quinone and benzoyl peroxide in a molar ratio of 1:4, respectively. When these materials had all been thoroughly mixed 0.05 part of dimethyl aniline was incorporated. A glass mat was impregnated with the resin mixture so that the final product contained 58% resin, 15% filler and 27% glass mat. This prepreg was placed in an oven at 65° C. where it gelled in 5 minutes. The B-staged prepreg sheet formed in this way was placed in storage at ambient temperatures.

Example 26.—Preparation of a molded article

The glass mat prepregs of Example 25 were used in a molding operation to make hard, rigid material plastic bowls. The sheets were cut to size, placed across a positive-closing type dish mold 1⅝ inches deep, having a 5-inch diameter base and a 10-inch diameter opening. The mold heated to 150° C. was closed at 1250 p.s.i.g. and held for 2 minutes. The bowls made with either of the above mats after one day's, one week's and three months' storage were all essentially the same.

Example 27.—Use of 2,4-dichlorobenzoyl peroxide as an initiator (a) To 100 parts of the polyester-styrene solution of Example 25, there was added 0.5 part of 2,5-ditertiarybutyl quinone, 1 part of 2,4-dichlorobenzoyl peroxide (a molar ratio of quinone to chlorinated peroxide of 1:1.4), 2.0 parts of dicumyl peroxide, 30 parts of calcium carbonate powder, 5.0 parts of an 80% butadiene-styrene unsaturated copolymer in vinyl toluene and 0.05 part of dimethyl aniline. The above mixture was stirred until a completely dispersed system was obtained. This mixture was poured onto one glass mat and covered with another glass mat to give an unpolymerized prepreg composition of 47% resin mixture, 20% carbonate and 33% glass. This material was allowed to stand at ambient temperatures, at which gelation occurred after about 30 minutes. The product was a B-staged polyester prepreg which was stored at ambient temperatures.

(b) The prepreg of Example 27a was used in the dish mold of Example 26. Bowls were made from these B-staged prepregs which had been in storage for 1 week and for 3 months. The strength properties, e.g., flexural strength, flexural modulus, and impact strength, of all these bowls were essentially the same.

Example 28.—Use of azobisisobutyro nitrile as an initiator (a) The polyester-styrene solution of Example 25, 20 parts, was mixed with 10 parts of aluminum silicate, 0.075 part of 2,5-ditertiarybutyl quinone, 0.2 part of dicumyl peroxide and 0.1 part of azobisisobutyro nitrile. This corresponds to a molar ratio of 2,5-ditertiarybutyl quinone to azobisisobutyro nitrile of 1:1.5. The mixture was placed in an aluminum dish, and heated at 74° C. for 35 minutes. After 22 minutes the sample had gelled. It was cooled and found to have the plastic, rubbery consistency indicating a B-staged polyester. The sample was placed in an oven at 121° C. and heated for 10 minutes. After cooling to room temperature, a hard, rigid, disc having a Barcol hardness of 50 was obtained.

(b) The same experiment was repeated, except that 0.2 part of azobisisobutyro nitrile was used in place of 0.1 part. In this case the molar ratio of quinone to azo compound was 1:3. The material gelled to the B stage in 15 minutes at 74° C. The finally cured disc had the same Barcol hardness as that of Example 27a.

Example 29.—B-staged polyester containing di-t-butyl peroxide

Substantially the same procedure was used as in Example 10 except that di-t-butyl peroxide was used in place of dicumyl peroxide. Comparable results were obtained.

As will be evident to those skilled in the art, various modifications on this invention can be made or followed, in the light of the foregoing disclosure and discussion, without departing from the spirit or scope of the disclosure or from the scope of the following claims.

I claim:

1. A process for producing a stable B-staged form of a copolymerized unsaturated polyester-ethylenically unsaturated monomer composition which comprises forming a fluid mixture of an unsaturated polyester and 5 to 75% by weight, based on said mixture, of an ethylenically unsaturated copolymerizable monomer, incorporating in said mixture 0.01 to 5.0% by weight of a free radical polymerization initiator which is capable of activation at temperatures below about 65° C. and a 2,5-ditertiary-alkyl p-benzoquinone in which the alkyl radicals contain a total of from 6 to 20 carbon atoms, said quinone being incorporated in an amount such that the mol ratio of quinone to initiator ranges from 1:0.5 to 1:4 and thereafter activating said initiator at a temperature below about 65° C.

2. The process of claim 1 further characterized in that a catalytic amount of a second free radical polymerization initiator is incorporated in said fluid mixture, said second initiator being thermally stable up to about 65° C.

3. The process of claim 1 wherein the ditertiaryalkyl p-benzoquinone is 2,5-ditertiarybutyl p-benzoquinone.

4. An unsaturated polyester composition polymerizable to a stable B-stage polyester comprising:
(A) a fluid mixture of an unsaturated polyester and 5 to 75% by weight, based on said mixture, of an ethylenically unsaturated copolymerizable monomer,
(B) a catalytic amount of a free radical initiator which is capable of activation at temperatures below about 65° C., and
(C) a 2,5-ditertiaryalkyl p-benzoquinone in which the alkyl radicals contain a total of from 6 to 20 carbon atoms in an amount such that the mol ratio of quinone to initiator is within the range of 1:0.5 to 1:4.

5. Composition of claim 4 in which the initiator is present in an amount of 0.01 to 5.0% by weight of said fluid mixture.

6. Composition of claim 4 in which the free radical initiator is an organic peroxide.

7. Composition of claim 4 wherein the ditertiaryalkyl p-benzoquinone is 2,5-ditertiarybutyl p-benzoquinone.

8. In the process of forming a prepreg involving the impregnation of a fibrous filler with a resinous mixture of an unsaturated polyester copolymerizable with an ethylenically unsaturated monomer, the improvement of impregnating a fibrous filler with said resinous mixture containing 0.01 to 5.0% by weight based on said mixture of a free radical polymerization initiator and a 2,5-ditertiary alkyl p-benzoquinone in which the alkyl radicals contain a total of from 6 to 20 carbon atoms in an amount such that the mol ratio of quinone to initiator is within the range of 1:0.5 to 1:4.

9. Improvement according to claim 8 wherein the resinous mixture contains in addition a catalytic amount of a second free radical polymerization initiator, which second initiator is thermally stable up to about 65° C.

10. A stable B-stage prepreg produced by the process of claim 8.

References Cited

UNITED STATES PATENTS 2,610,168  9/1952  Anderson _____ 260—866

FOREIGN PATENTS 901,603  7/1962  Great Britain.

OTHER REFERENCES

Cotten et al.: Action of Regulators in Polymerization of Monomers, J. Pol. Sci., vol. 3, No. 1 (1942).

SAMUEL H. BLECH, *Primary Examiner.*

JOHN T. GOOLKASIAN, *Assistant Examiner.*

U.S. Cl. X.R.

260—40, 45.95